United States Patent Office.

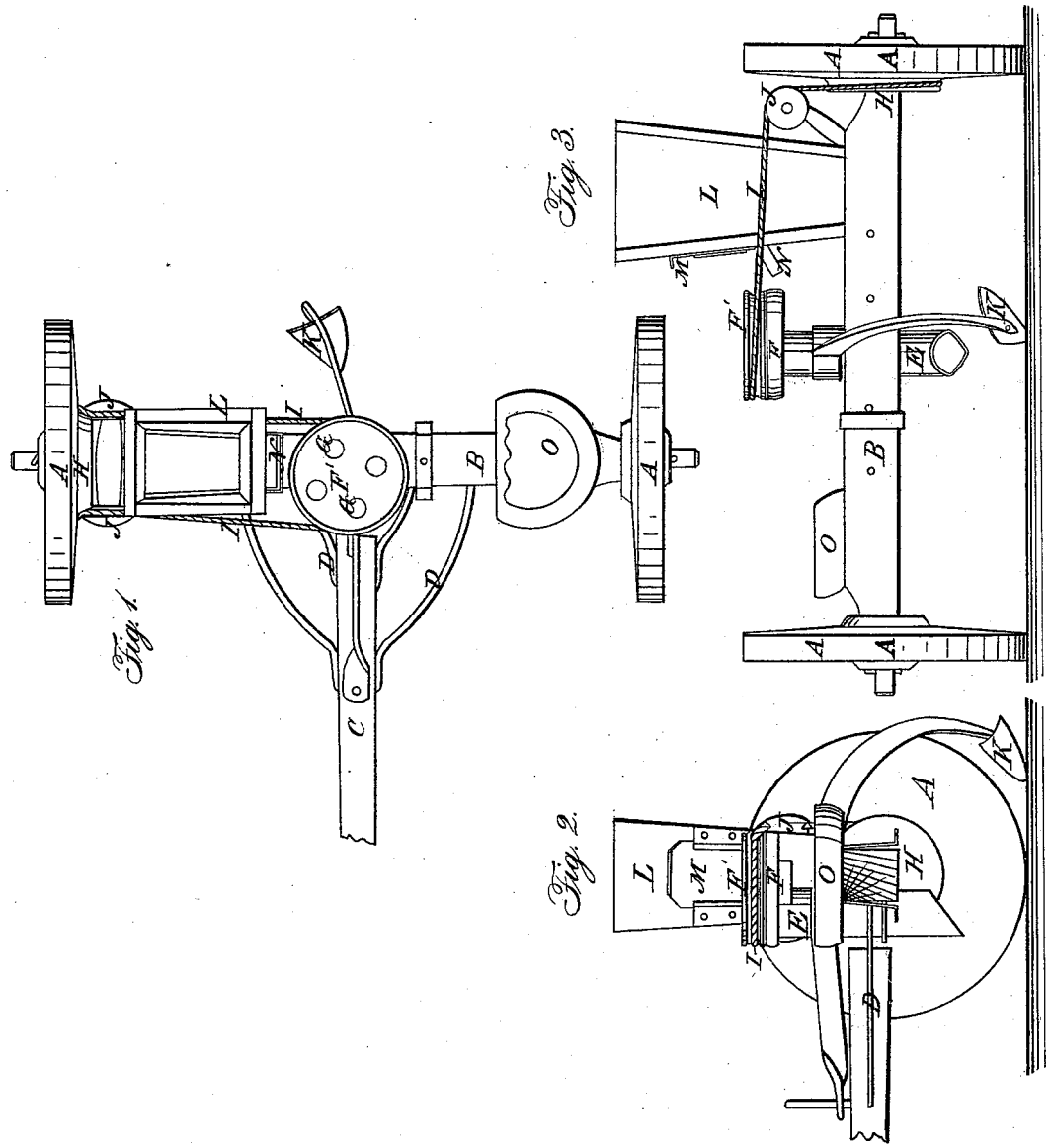

JOHN CROCO, OF HOLMESVILLE, OHIO.

Letters Patent No. 64,080, dated April 23, 1867.

---

IMPROVEMENT IN POTATO DRILLS.

---

The Schedule referred to in these Letters Patent and making part of the same.

---

TO ALL WHOM IT MAY CONCERN:

Be it known that I, JOHN CROCO, of Holmesville, in the county of Holmes, and State of Ohio, have invented certain new and useful Improvements in Potato Drills, being an improvement on a patent granted to me October 2, 1866; and I do hereby declare that the following is a full and complete description of the construction and operation of the same, reference being had to the accompanying drawings, making a part of this specification, in which—

Figure 1 is a top view of the drill.
Figure 2 is a vertical section.
Figure 3 is a rear end view.
Like letters of reference refer to like parts in the views.

In fig. 1, A is a pair of wheels; B an axle; and C a tongue secured and braced to the axle by the hounds D. To the point of the axle is attached a metallic tube or spout, E, in the position as shown in fig. 2. On the top of this spout is a pair of disks, F F', fig. 3, of which F is fixed to the tube, and F' pivoted so as to revolve upon its centre, and is provided with four holes G, arranged in the order as shown in fig. 1. A larger or a less number of holes may be used according to the distance required to drop the potatoes. H, fig. 2, is a grooved pulley secured to the wheel A, and by means of which the disk F' is driven by a belt, I, which is made to pass over the guide and tension-pulleys J. K is a shovel-plough, so arranged in relation to the tube E, as shown in fig. 3, in which it will be seen that it is not in a right line with the spout, but set off a little to one side, also that it depends below the point of the spout.

The practical operation of this machine is as follows: The potatoes are thrown into the hopper L, fig. 3, the gate M is then raised, and the potatoes allowed to come down into the conductor N, and from which they are taken by a boy occupying the seat O, and are dropped one by one into the holes G referred to as the drill moves along in the direction of the work. The spout furrows out the ground and drops the potato, which is then covered by the shovel following at one side of the row, and the work of planting is thus easily and rapidly performed. As the holes are of a size to contain one potato only, hence one only is dropped at a time, and at regular distances, and which distance, as above described, may be gauged by the number of holes in the revolving disk. The spout and shovel are so attached to the axle that they may be moved upward or downward, and thus may be regulated the depth of planting and covering the potatoes. The spout can be adjusted independently of the shovel, and by this means the seed may be planted deep and lightly covered, and so, reversely, the shovel may be adjusted independently of the spout, and thus the potatoes may be planted shallow, but deeply covered.

The advantage of this drill over my former drill, is that the use of springs and signals to indicate the moment of dropping the potato is dispensed with, and the work of dropping performed by the operator placing the seed in the revolving disk, and therefore requiring less care and attention on the part of the dropper, he having only to keep the holes supplied, and the work of planting goes on without his further care, with greater certainty and regularity than in the former machine. This machine is more readily adjusted for the purpose of planting at different distances, for all that is required in this drill is to change the revolving disk for one having a more or less number of holes as the case may be, whereas in the former drill it required much more time and labor in order to make the necessary change to effect the signal to indicate the moment for dropping the seed.

What I claim as my improvement, and desire to secure by Letters Patent, is—

1. The disks F F' as constructed and arranged, in combination with the guide or tension-pulley J, and pulley H, for the purpose and in the manner set forth.

2. The disks F F', hopper L, in combination with the tube E, and shovel K, as and for the purpose described.

JOHN CROCO.

Witnesses:
  W. H. BURRIDGE,
  J. H. BURRIDGE.